May 2, 1939.  O. C. DURYEA  2,156,777
SAFETY TREAD
Filed July 11, 1936
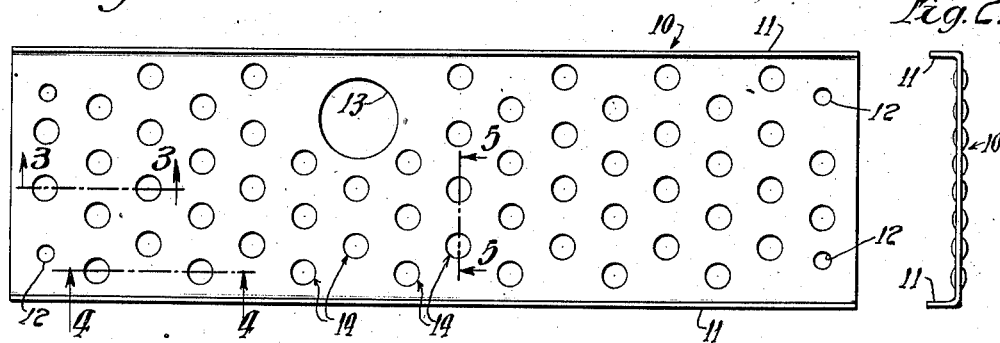
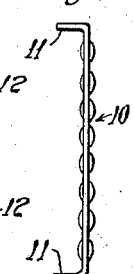
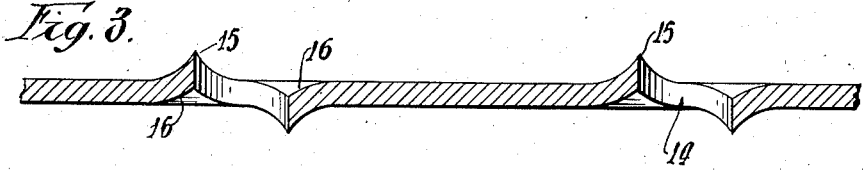
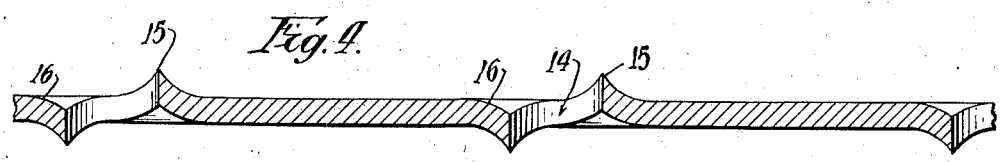
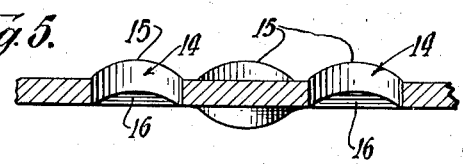
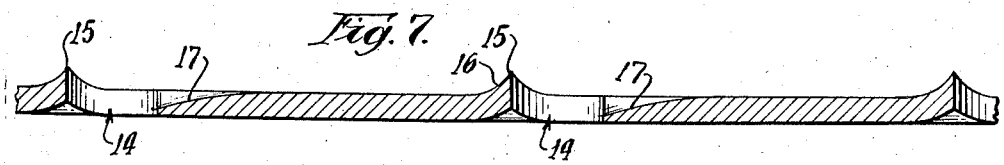
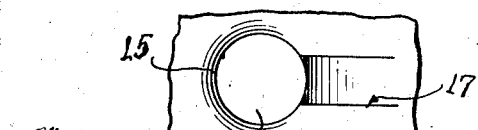
Inventor:
Otho C. Duryea,
By: [signature]
Attorney.
Witness:
E. Camporini Patented May 2, 1939

2,156,777

UNITED STATES PATENT OFFICE 2,156,777

SAFETY TREAD

Otho C. Duryea, Waterbury, Conn.

Application July 11, 1936, Serial No. 90,162

4 Claims. (Cl. 94—5)

This invention relates to improvements in safety treads for brake and other steps, on railroad vehicles, outdoor stairways, platforms and the like, and it consists of the matters hereinafter described and more particularly pointed out in the appended claims.

One of the objects of the invention is to provide a safety tread which is so made as to be self-draining.

A further object of the invention is to provide a safety tread which is simple in construction so that it can be made at a low cost.

Another object of the invention is to provide a safety tread made from a single piece of sheet material, and which is so formed as to insure a long period of usefulness under the most adverse conditions.

The above mentioned objects of the invention, as well as others, together with the advantages thereof, will more fully appear as the specification proceeds.

In the drawing:

Fig. 1 is a view in plan elevation of a brake step for railroad vehicles, embodying the preferred form of the improved safety tread;

Fig. 2 is a view in end elevation thereof;

Figs. 3 and 4 are detail longitudinal vertical sectional views, on an enlarged scale, through portions of the tread as taken on the lines 3—3 and 4—4 of Fig. 1;

Fig. 5 is a detail transverse vertical sectional view through a portion of the tread, as taken on the line 5—5 of Fig. 1; and Figs. 6 and 7 are detail longitudinal vertical sectional views illustrating modified forms of the invention and which will be more fully referred to later;

Fig. 8 is a top plan view of a fragmentary part of the step shown in Fig. 7, about one of the openings therein.

The invention is herein shown and described as embodied in a brake step for a railroad car, but this is to be considered only in the illustrative sense because as is apparent, the improved tread may be embodied in other structures where the peculiar characteristics of the invention make it of advantage to do so.

Referring now in detail to that embodiment of the invention, illustrated in Figs. 1 to 5 inclusive, of the accompanying drawing:

10 indicates, as a whole, an elongated rectangular metal plate of suitable dimensions forming a brake step and provided along two of its longer edges with upstanding flanges 11—11. Near the four corners of the plate are holes 12 to receive the means for fastening the step to the associated supporting brackets on a car. At a point between its ends, near one of the flanges 11, is a hole 13 of larger diameter for the passage of the brake actuating shaft or mast.

14—14 indicate a plurality of drainage openings in the plate arranged in rows extending longitudinally and transversely of the plate, with the openings in one row staggered or offset with respect to those in the adjacent row.

Associated with certain openings in the plate on one or both surfaces thereof, are upstanding projections 15 having relatively sharp edges. Each projection, as herein shown, is highest at its mid portion and blends or merges at its ends into that surface of the plate from which it projects. Preferably, but not necessarily so, each opening 14 is round or circular. When said projections 15 are disposed upon both surfaces of the plate, the projection on one side of each opening is on one side of the plate and the projection on the other side of each opening is on the other side of the plate, as best appears in Figs. 3 to 5. When the openings are round or circular as mentioned, the associated projections will assume a somewhat crescent-like shape. It is not necessary that these sharp edged projections on one surface of the plate all be on the same side of the associated opening. As best shown in Figs. 3 and 4, the upstanding projections for the openings in one row of openings, may be on one side of the associated opening and the upstanding projections for the openings in the next row may be on the other or opposite side of the associated opening.

In any event, it is desired that the projections have a circumferential extent less than that of the associated opening so as to permit drainage from the top surface of the plate into the opening. Thus rain water, snow and ice cannot accumulate on the top surface of the plate or pile about and cover up the projections to such an extent as to make them ineffective for their intended purpose.

To assist in accelerating drainage from the top surface of the plate into the openings, a recess may be formed in the plate adjacent desired openings with a bottom 16 that is inclined from said top surface downwardly to open into that side of the opening opposite the projection.

As shown in Figs. 3 to 5 inclusive, portions of the plate upon opposite sides of each opening are upset in opposite directions to form the projections. Thus, those portions of the projections which were upset to form the projections on the bottom of the plate, serve to form the recesses with the inclined bottom on the top surface of the plate and vice versa.

It is preferable that in the upsetting of the portions mentioned, these portions be very closely adjacent the associated opening so that what was formerly a part of the surface of the opening now forms a part of the surface of the projection. In this manner a part of the corner edge of the opening forms the relatively sharp edge 15 for the associated projection. This operation can be carried out while the sheet is in a cold condition, by suitable dies.

In Fig. 6, I have illustrated a slightly modified form of the invention, where the projections are formed only on one side of the plate. This, of course, eliminates or omits the recess with its inclined bottom surface 16 before mentioned. It is to be noted, however, that drainage may still take place through the opening. In Fig. 7, I have illustrated a further modified form of the invention wherein the projections 15 are arranged upon the top surface only of the plate with each projection arranged at one side of its associated opening 14. In said top surface of the plate, upon that side of each opening opposite the projection 15 is formed a recess 17. This recess has an inclined bottom surface, the lower inner end of which communicates with the opening 14. This recess provides for drainage from the top surface of the plate into and through the opening 14. No projection is formed upon the flat bottom surface of the plate below the recess 17.

It is to be noted that the top edge of each projection, as formed by a corner part of the associated opening is quite sharp. With these openings and projections formed relatively closely adjacent, the shoe sole engages said edges in a manner which effectively prevents slipping.

It is apparent that water from rain, sleet or melting snow, or otherwise, cannot remain on the upper surface of the plate as it will drain out through the openings. Therefore, as no water can remain on said surface, it cannot freeze into ice thereon. This makes the tread surface of the plate extremely safe and therefore, practical to use on brake steps for cars.

While in describing the invention, I have referred in detail to the form, arrangement and construction of the parts of the plate, the same is to be considered only in its illustrative sense so that I do not wish to be limited thereto except as may be specifically set forth in the appended claims.

I claim as my invention:

1. A safety tread comprising a plate-like member having a plurality of drainage openings therethrough and a plurality of relatively sharp edged projections extending from at least one side of said plate-like member, each adjacent a portion only of certain of said openings, said side of said plate-like member being formed to provide inclined grooves that open into one side of certain of said openings, the plate-like member being flat beneath said grooves.

2. A safety tread comprising a plate-like member having a plurality of drainage openings therethrough and a plurality of relatively sharp edged projections extending from one side of the plate like member and each bounding and defining a part of each of certain of said openings, said side of said plate-like member being formed with inclined grooves that open into one side of each of said certain of said openings, the plate-like member being flat beneath said grooves.

3. A safety tread comprising a plate-like member having a plurality of drainage openings therethrough, portions of said member at one side of certain of said openings being displaced to project outwardly from one side of said member to form a sharp edged projection about a portion only of certain of said openings, said side of said member being formed to provide inclined grooves that open into another portion of each of said certain of said openings, the plate-like member being flat beneath said grooves.

4. A safety tread comprising a plate-like member having a plurality of drainage openings therethrough and a plurality of relatively sharp edged projections extending from each side of the member, said projections being arranged in pairs for each of certain of said holes, the projections for each opening being arranged opposite each other, there being an inclined groove associated with each projection and arranged in that side of the plate-like member opposite that side carrying the projections, portions of the plate-like member beneath said grooves being flat.

OTHO C. DURYEA.